United States Patent
Peenikal et al.

(10) Patent No.: US 11,017,390 B2
(45) Date of Patent: May 25, 2021

(54) SECURE METHOD OF PROVIDING A DELIVERY ADDRESS DURING A TOKENIZED TRANSACTION

(71) Applicant: IPCO 2012 LIMITED, London (GB)

(72) Inventors: Sunil Peenikal, London (GB); Sudarshan Thalenjeri, London (GB)

(73) Assignee: IPCO 2012 LIMITED, London (GB)

( * ) Notice: Subject to any disclaimer, the term of this patent is extended or adjusted under 35 U.S.C. 154(b) by 145 days.

(21) Appl. No.: 16/313,845

(22) PCT Filed: Jun. 29, 2017

(86) PCT No.: PCT/GB2017/051903
§ 371 (c)(1),
(2) Date: Dec. 27, 2018

(87) PCT Pub. No.: WO2018/002627
PCT Pub. Date: Jan. 4, 2018

(65) Prior Publication Data
US 2019/0197531 A1    Jun. 27, 2019

(30) Foreign Application Priority Data
Jun. 30, 2016 (GB) ..................... 1611470

(51) Int. Cl.
*G06Q 30/00* (2012.01)
*G06Q 20/38* (2012.01)
(Continued)

(52) U.S. Cl.
CPC ....... *G06Q 20/385* (2013.01); *G06Q 10/0838* (2013.01); *G06Q 20/02* (2013.01);
(Continued)

(58) Field of Classification Search
None
See application file for complete search history.

(56) References Cited

U.S. PATENT DOCUMENTS 7,853,481 B1 * 12/2010 Johnson ............. G06Q 30/0633
705/26.42
2002/0174062 A1   11/2002 Sines et al.
(Continued)

FOREIGN PATENT DOCUMENTS

WO   2009072977 A1   6/2009
WO   2012068480 A2   5/2012

OTHER PUBLICATIONS

PCT International Search Report and Written Opinion, Application No. PCT/GB2017/051903, dated Aug. 16, 2017, 17 pps.

*Primary Examiner* — Mila Airapetian

(57) ABSTRACT

The present disclosure relates to a secure method of providing a delivery address during a tokenized payment transaction scheme. A consumer places an order with a merchant without providing a delivery address. A distributor that collects payments due to the merchant requests a payment identification code and a delivery address from a payment agent. The request includes payment information. The payment agent generates and stores a payment identification code along with the payment information, and sends the code to the consumer via the distributor. The consumer forwards the code to a financial institution for forwarding to the payment agent who returns the payment information along with a request for a delivery address. The consumer may respond by authorizing the payment and by providing a delivery address. The financial institution then arranges the payment to the merchant and sees that the merchant receives the delivery address.

17 Claims, 10 Drawing Sheets

(51) Int. Cl.
  *G06Q 20/12* (2012.01)
  *G06Q 10/08* (2012.01)
  *G06Q 30/06* (2012.01)
  *G06Q 20/40* (2012.01)
  *G06Q 20/20* (2012.01)
  *G06Q 20/42* (2012.01)
  *G06Q 20/02* (2012.01)

(52) U.S. Cl.
  CPC .............. *G06Q 20/12* (2013.01); *G06Q 20/20* (2013.01); *G06Q 20/40* (2013.01); *G06Q 20/425* (2013.01); *G06Q 30/0635* (2013.01)

(56) References Cited

U.S. PATENT DOCUMENTS

| | | |
|---|---|---|
| 2013/0124364 A1 | 5/2013 | Mittal |
| 2015/0254672 A1* | 9/2015 | Huesch .............. G06Q 20/4097 705/44 |
| 2016/0110800 A1* | 4/2016 | Manning .............. G06Q 20/123 705/26.81 |

* cited by examiner

SECURE METHOD OF PROVIDING A DELIVERY ADDRESS DURING A TOKENIZED TRANSACTION

CROSS REFERENCE TO RELATED APPLICATIONS

This patent application is a National Stage Entry of PCT/GB2017/051903 filed on Jun. 29, 2017, which claims the benefit and priority of Great Britain Patent Application No. 1611470.4 filed on Jun. 30, 2016, the disclosures of which are incorporated herein by reference in their entirety as part of the present application.

BACKGROUND

The present disclosure relates to a secure method of providing a delivery address during a tokenized payment transaction scheme.

There are known disadvantages to making online payments, for example during internet shopping. Most of these disadvantages result from security risks associated with making online payments. For example, a consumer is required to enter sensitive financial information into a computer for submission across the internet, which exposes the consumer to well-known risks of having that sensitive financial information stolen and used fraudulently.

Tokenized transaction schemes have been proposed to address such concerns. These schemes have the advantage of allowing a transaction to be arranged without the need for a consumer to share their sensitive financial information with a merchant. Instead, the transaction is arranged using a trusted third party.

For example, when making a purchase, a consumer may want to pay using a tokenized payment scheme. The consumer may request a token or code from a trusted third party, namely a payment agent. This may be done from a merchant website or from a mobile computing device app or other software provided on one of the consumer's computing devices. The payment agent generates a code, saves the consumer's details against the code, and sends the code to the consumer. The consumer then provides the code to the merchant, for example by entering the code on a payment page on the merchant's website. The merchant then sends a request for payment to the payment agent that includes transaction details (for example, quantity of goods ordered, price and date and time of sale), along with the code signifying the details of the consumer. The payment agent uses the code to retrieve the consumer's details, and then sends the transaction details to the consumer for the consumer to authorize the payment. The consumer may view the transaction details, for example on one of the consumer's computing devices. If authorized, the consumer sends a positive response to the payment agent that authorizes the transaction. The payment agent may then arrange for a payment to be made to the merchant in accordance with the merchant's original request for payment. The payment agent may notify the consumer and merchant that the transaction has been arranged such that the merchant may release the goods or services to the consumer. At no time during the transaction is the consumer's sensitive financial information passed to the merchant. WO2009/072977 describes a prior art tokenized payment scheme like this.

While the above represents an improvement to the security in arranging a transaction, it does not address any security issues associated with the consumer providing a delivery address to the merchant. The present disclosure addresses the issue of providing a delivery address.

BRIEF DESCRIPTION

A first aspect of the present disclosure provides a computer-implemented method of facilitating placement of an order between a consumer and a merchant.

The method includes a (i) computing apparatus of the consumer submitting an order to computing apparatus of the merchant without providing a delivery address. The order may be for goods or services or both. The delivery address may be the address to where the goods are to be delivered. Where services are to be provided, the delivery address may be the address at which the services will be provided. If the services are to be provided elsewhere, the delivery address may be the address to which an invoice is to be delivered or it may merely correspond to an address of record of the consumer (e.g. for tax purposes).

The method further includes (ii) computing apparatus of a distributor sending a request for a payment identification code and a delivery address to computing apparatus of a payment agent. The distributor is associated with the merchant for collecting payments due to the merchant. The request for a payment identification code and a delivery address includes payment information identifying the merchant and the amount to be paid.

The request may be sent by computing apparatus of the merchant when the merchant acts as its own distributor. The payment information included in the request for a payment identification code may identify the distributor.

The request may be initiated by the distributor, for example where the consumer is shopping on a website, and checks out and is directed to a payment page (or even a payment frame set within a webpage) that is hosted by the distributor. Alternatively, the method may further include an initial step of computing apparatus of the merchant sending the request for a payment identification code and a delivery address to the distributor's computing apparatus, wherein the request for a payment identification code and delivery address includes payment information identifying the merchant and the amount to be paid. In this case, the distributor's computing apparatus may forward the request to the payment agent.

This first communication from the merchant side of the transaction may or may not be a request for a pull payment. For example, the request may be a formal request for a pull payment. Alternatively, the merchant or distributor may merely request a payment identification code from a payment agent without requesting a pull payment. Instead, to allow the payment agent to arrange the transaction, the merchant and/or distributor may provide payment information including a merchant identifier and the amount to be paid and, optionally, an identifier of the distributor. This allows the payment agent to provide this information to the consumer later such that the consumer may check and authorize the payment. It then allows a push payment to be instructed by the consumer as the payment amount and the merchant (and optionally the distributor) are identified.

Next, the method includes (iii) the payment agent's computing apparatus generating a payment identification code to be associated with the payment information that is unique thereby allowing the payment to be unambiguously identified. The payment agent's computing apparatus stores the payment identification code with the associated payment information and an indication that a delivery address is to be collected. The payment agent's computing apparatus may also store an indication of the distributor, optionally including an indication of whether the payment associated with the transaction should be made to the distributor or to the merchant. The payment agent's computing apparatus may also provide the payment identification code to the distributor's computing apparatus and/or to the merchant's computing apparatus (either directly or indirectly, for example via the distributor's computing apparatus). Thus, the merchant or distributor is now in possession of a unique code identifying the transaction that may be provided to the consumer such that the consumer may identify independently the transaction to the payment agent.

The method further includes (iv) the distributor's computing apparatus providing the consumer with the payment identification code, either directly or via the merchant's computing apparatus. Hence, the method further includes (v) computing apparatus of the consumer receiving the payment identification code. This computing apparatus may be the same as the consumer's computing apparatus that submitted the order in step (i) of the method. Alternatively, this computing apparatus may be a second computing apparatus of the consumer. For example, the consumer may use a first computer such as a laptop or desktop computer to shop online, but may then use a mobile computing device to authorize the transaction.

The method further includes (vi) the consumer's computing apparatus that received the payment identification code sending the payment identification code to computing apparatus of a financial institution. The financial institution is a financial institution associated with the consumer for making payments from the consumer. The method further includes (vii) the financial institution's computing apparatus sending the payment identification code to the payment agent's computing apparatus. Step (vii) may include the financial institution's computing apparatus storing the payment identification code with an indication of the consumer from whom it was received.

At step (viii) of the method, upon receiving the payment identification code, the payment agent's computing apparatus uses the payment identification code to retrieve the previously stored payment information associated with the payment identification code. The method then includes the payment agent's computing apparatus sending the payment information associated with the payment identification code to the financial institution's computing apparatus and, in response to the stored indication that a delivery address is required, also sending a request for a delivery address to the financial institution's computing apparatus. The payment agent's computing apparatus may send the payment information associated with the payment identification code and the request for a delivery address as one message or as separate messages. The payment information may be sent with or without the payment identification code.

Next, the financial institution's computing apparatus may use the received payment identification code to retrieve the consumer identification. The financial institution's computing apparatus may store all or at least some of the payment information associated with the payment identification code. This may include the indication of whether payment is to be made to the distributor or to the merchant.

The method then includes (ix) the financial institution's computing apparatus sending the payment information, the payment identification code and the request for a delivery address to the consumer's computing apparatus that received the payment identification code. Then, the method includes (x) the consumer's computing apparatus that received the payment identification code displaying the payment information for authorization by the consumer and, in response to receiving the request for a delivery address, prompting the consumer to select a delivery address. For example, the consumer's computing apparatus may display the merchant identifier and the amount of the payment. The payment information may include details about the items purchased, for example a short description of each item and the cost of each item, in which case this information may also be displayed.

The method then includes (xi) the consumer's computing apparatus that received the payment identification code receiving an authorization and a selection of a delivery address from the consumer. The consumer's computing apparatus that received the payment identification code then sends a request to pay message including the payment identification code and an indication of the selected delivery address to the financial institution's computing apparatus. This request to pay message may be in effect an acceptance of an earlier request for a pull payment made by the merchant and/or distributor, or it may be an instruction to make a push payment.

The method then includes (xii) the financial institution's computing apparatus arranging for a payment from the consumer to the merchant, either directly to the merchant or indirectly via the distributor. To where the payment is made may be determined by the indication of whether the payment should be made to the merchant or the distributor previously sent and stored at step (viii). The payment may be effected through a pre-agreed payment mechanism, for example as a UK faster payment. The method also includes (xiii) the merchant's computing apparatus receiving the indication of the selected delivery address, either directly to the merchant or indirectly via the distributor.

The present disclosure provides a secure way for a consumer to communicate their address to a merchant. Usually, a delivery address must be provided before a payment is authorized, and perhaps before the consumer has the opportunity to change their mind and withdraw from a transaction. As a delivery address will correspond to personal information regarding the consumer, it is advantageous for this personal information to be handled as securely as possible.

According to the present disclosure, the delivery address is not supplied by the consumer until the consumer authorizes the transaction. Hence, the delivery address is not released to the merchant until after the consumer has authorized the transaction.

Security is further enhanced because the delivery address is provided to the financial institution rather than to the merchant. This allows the financial institution to check the authenticity of the merchant before providing the consumer's delivery address to the merchant. Moreover, from the merchant's point of view, the system is improved because they are provided with an address by the financial institution, and so will be trusted address. Hence, the method of the present disclosure provides further layers of security to prior art methods.

Furthermore, the enhanced security offered by this method of providing the delivery address complements the enhanced security provided by the tokenized transaction scheme. Thus, the present disclosure adds to the inherent security provided in a tokenized transaction scheme. This is especially true where the tokenized transaction scheme arranges a push payment from the consumer to the merchant (or to the distributor). As explained above, the initial request for a payment identification code made by the distributor or merchant at step (ii) need not be a formal request for a pull payment. When the consumer provides their authorization at step (xi), this authorization may be an instruction to make a push payment. Hence, it is only when the consumer provides their instruction to make a push payment that the delivery address is released and may then be provided to the merchant.

The above methods describe situations where the merchant requests the payment identification code, but the disclosure may also be practiced in methods where the consumer requests the payment identification code and then passes the received payment identification code to the payee.

Hence, in a second aspect, the present disclosure provides a computer-implemented method of facilitating placement of an order between a consumer and a merchant. The method includes the following steps.

(a) Using computing apparatus of a consumer to send a request for a payment identification code to computing apparatus of a financial institution, wherein the financial institution is a financial institution associated with the payer for making payments from the consumer.

(b) The financial institution's computing apparatus sending a request for a payment identification code to computing apparatus of a payment agent.

(c) The payment agent's computing apparatus responsively generating a payment identification code that is unique thereby allowing the payment to be unambiguously identified and storing the payment identification code with an indication of the requesting financial institution, and providing the payment identification code to the financial institution's computing apparatus.

(d) The financial institution's computing apparatus sending the payment identification code to the consumer's computing apparatus. Optionally, the financial institution's computing apparatus may store the payment identification code with an indication of the consumer who requested the payment identification code.

(e) The consumer's computing apparatus submitting an order to computing apparatus of the merchant and providing the payment identification code but not providing a delivery address.

(f) Computing apparatus of a distributor sending a message to the payment agent's computing apparatus, wherein the distributor is associated with the merchant for collecting payments due to the merchant, and wherein the message includes the payment identification code, payment information identifying the merchant and the amount to be paid, and a request for a delivery address.

(g) The payment agent's computing apparatus storing the payment information and an indication that a delivery address is to be obtained with the associated payment identification code, and sending the payment information and a request for a delivery address to the financial institution's computing apparatus.

Now that the payment identification code has been exchanged between the consumer and the merchant, and the payment information associated with the payment identification code has been acquired by the financial institution, we are a similar stage in the transaction as for the end of step (viii) of the first aspect of the present disclosure. Hence, the following steps are the same as for the first aspect of the present disclosure, and so common numbering of steps (ix) to (xiii) is used.

Thus, the method according to the second aspect further also includes the following steps.

(h) The financial institution's computing apparatus sending the payment information, the payment identification code and the request for a delivery address to the consumer's computing apparatus that received the payment identification code.

(i) The consumer's computing apparatus that received the payment identification code displaying the payment information for authorization by the consumer and, in response to receiving the request for a delivery address, prompting the consumer to select a delivery address.

(j) The consumer's computing apparatus that received the payment identification code receiving an authorization and a selection of a delivery address from the consumer, and sending a request to pay message including the payment identification code and an indication of the selected delivery address to the financial institution's computing apparatus.

(k) The financial institution's computing apparatus arranging for a payment from the consumer to the merchant, either directly to the merchant or indirectly via the distributor.

(l) The merchant's computing apparatus receiving the indication of the selected delivery address.

Further features that may be applicable to both the first and second aspects of the present disclosure will now be described.

The financial institution's computing apparatus may send a message identifying the selected delivery address which is received by the merchant's computing apparatus. The message identifying the selected delivery address may be sent from the financial institution's computing apparatus to the merchant's computing apparatus via the payment agent's computing apparatus and, optionally, via the distributor's computing apparatus. The message identifying the selected delivery address may contain the payment identification code. This may allow the payment agent's computing apparatus and/or the distributor's computing apparatus to identify the transaction to which the delivery address belongs.

When the consumer's computing apparatus sends a request to pay message including the payment identification code and an indication of the selected delivery address to the financial institution's computing apparatus, the consumer's computing apparatus may include in the request either a postal delivery address or an identifying code. The identifying code may allow the financial institution's computing apparatus to retrieve from memory a postal delivery address for the consumer. The latter arrangement is particularly advantageous as the consumer no longer has to send their address over a relatively insecure link in the system.

The consumer's computing apparatus prompting the consumer to select a delivery address may include displaying a delivery address and prompting the consumer to confirm that the displayed address should be used. For example, the method may include displaying a stored default delivery address and prompting the consumer to confirm that the default delivery address should be used. Alternatively, the consumer's computing apparatus prompting the consumer to select a delivery address may include displaying multiple stored delivery addresses and prompting the consumer to select one of the displayed addresses to be used as the delivery address for the order.

BRIEF DESCRIPTION OF THE DRAWINGS

In order that the present disclosure may be more readily understood, example embodiments will now be described, by way of example only, with reference to the accompanying drawings in which.

DETAILED DESCRIPTION

Figure 1:
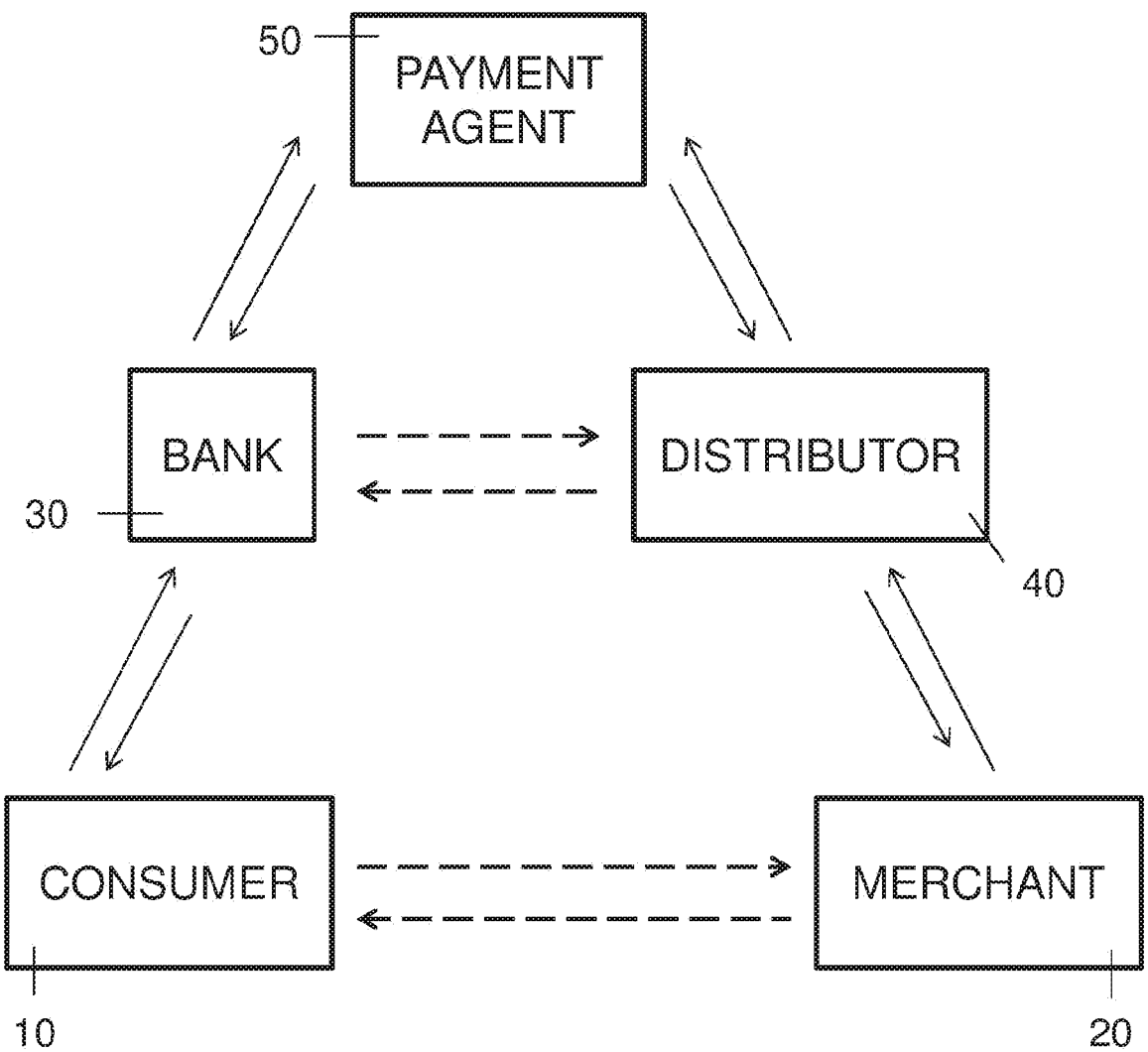
FIG. 1 is a schematic representation of the parties to a tokenized transaction.
Figure 2:
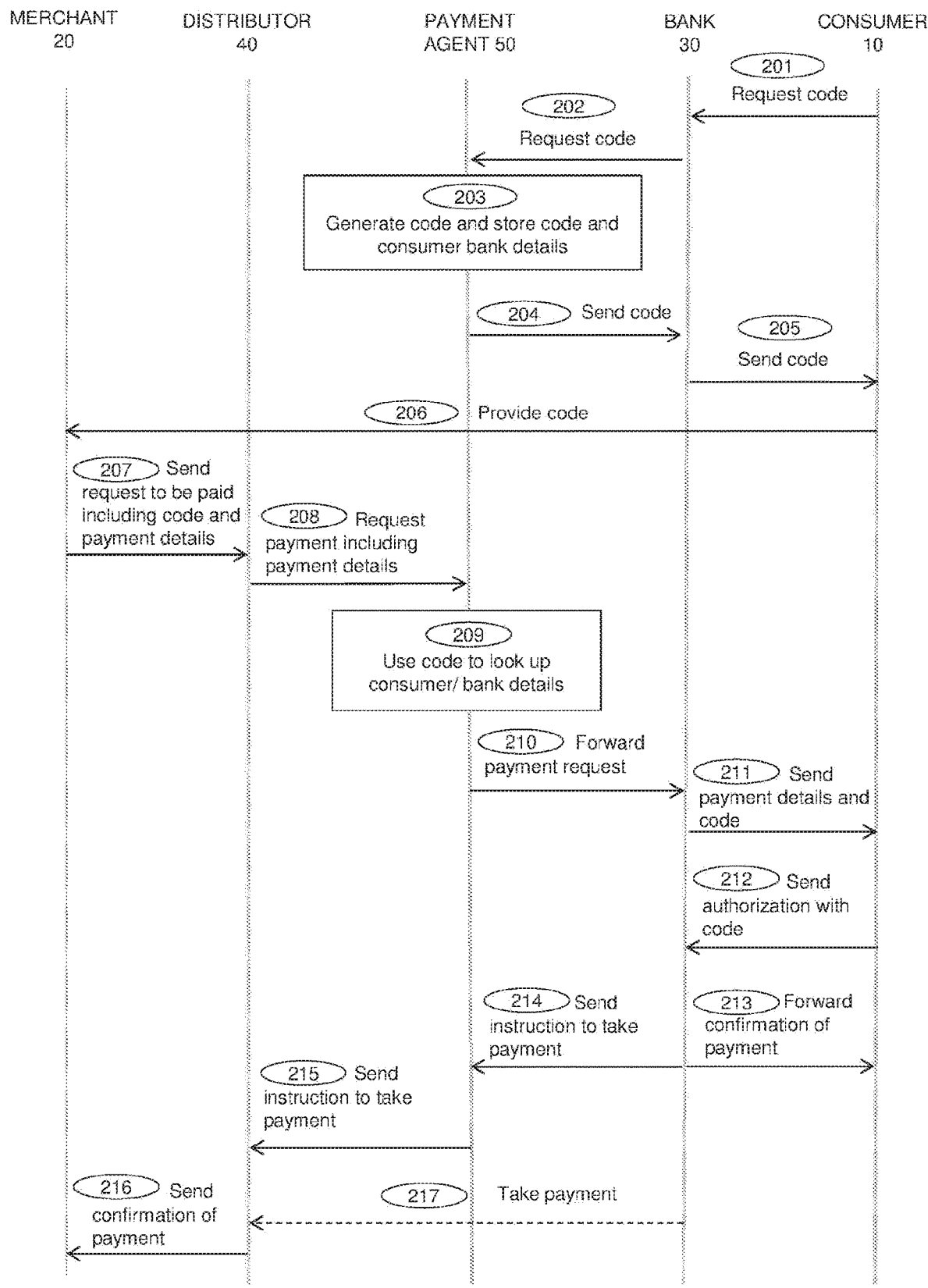
FIG. 2 is a schematic representation of the messages sent during a tokenized transaction according to the prior art.

FIGS. 1 and 2 show a known tokenized "pull" payment transaction scheme. FIG. 1 shows the parties involved in such a tokenized transaction. In this embodiment, a consumer 10 wishes to purchase goods or services from a merchant 20. The consumer 10 has an associated bank 30 or other financial institution that arranges for payments to be made by the consumer 10, and the merchant 20 has an associated distributor 40 who accepts payments on behalf of the merchant 20. The distributor 40 may be a financial institution such as a bank, or may have an association with a financial institution such as a bank that handles accounts on behalf of the distributor. There is also a payment agent 50 that acts as the trusted third party between the consumer 10 and the merchant 20. Other parties may be present in the scheme, for example other intermediaries or regulatory bodies.

The arrows in FIG. 1 show schematically how the parties may communicate with each other. The consumer 10 communicates with his or her bank 30, the bank 30 communicates with the payment agent 50, the payment agent 50 communicates with the distributor 40, and the distributor 40 communicates with the merchant 20. The consumer 10 and merchant 20 may also communicate directly with each other, for example when the consumer 10 is shopping on the merchant's website. The consumer's bank 30 may also communicate with the distributor 40 to make a requested payment.

FIG. 2 shows the messages sent as the transaction is conducted. FIG. 2 starts from the point where the consumer 10 has finished shopping and wishes to make a payment. This may correspond to when a consumer 10 has finished browsing on a merchant's website and has 'proceeded to checkout'. As the consumer 10 wishes to pay using a prior art tokenized "pull" payment transaction scheme, as a first step, the consumer 10 requests a token, namely a payment code, from their bank 30, as shown at 201. At 202, the consumer's bank 30 forwards this request for a payment code to the payment agent 50. At 203, the payment agent 50 generates a payment code and stores the payment code along with details that identify the consumer 10 and/or the bank 30. At 204, the payment agent 50 sends the payment code to the bank 30 and, at 205, the bank 30 forwards the payment code to the consumer 10.

The consumer 10 will then provide the payment code to the merchant 20 at 206. This may be done by typing the payment code into an associated text-entry field provided on the merchant's website, for example provided on a payment page. In response, the merchant 20 prepares a request for a pull payment that includes payment details such as the transaction amount and an identifier of the merchant 20. This request for a pull payment is sent with the payment code to the distributor 40 at 207. At 208, the distributor 40 sends the request for a pull payment including the payment code and payment details to the payment agent 50. At 209, the payment agent 50 looks up the payment code and retrieves the details that identify the consumer 10 and/or bank 30 associated with that payment code. The payment agent 50 then sends the request for a pull payment including the payment code and payment details to the bank 30 at 210, and the bank 30 then sends the payment details and the payment code to the consumer 10 at 211.

The consumer 10 may then view the payment details, for example the transaction amount and the merchant requesting the payment and, once satisfied that the payment request is genuine, may send an authorization at 212 to the bank 30 that allows the requested pull payment to be made. The bank 30 may then separately authorize the transaction, for example after a check has been made that the account selected by the consumer 10 has sufficient funds. Once authorized by the bank 30, the bank 30 sends a confirmation at 213 that the payment has been authorized to the consumer 10 and sends an instruction at 214 to take the payment to the payment agent 50 for forwarding to the distributor 40. At 215, the payment agent 50 duly forwards the instruction to the distributor 40.

At 216, the distributor 40 sends a confirmation to the merchant 20 that the payment has been authorized such that the merchant 20 can release the goods or services. As shown schematically at 217, the distributor 40 may then pull the payment from the consumer's bank 30. This may be done immediately or the payment may be taken at a later time, for example at the end of the day.

Figure 3:
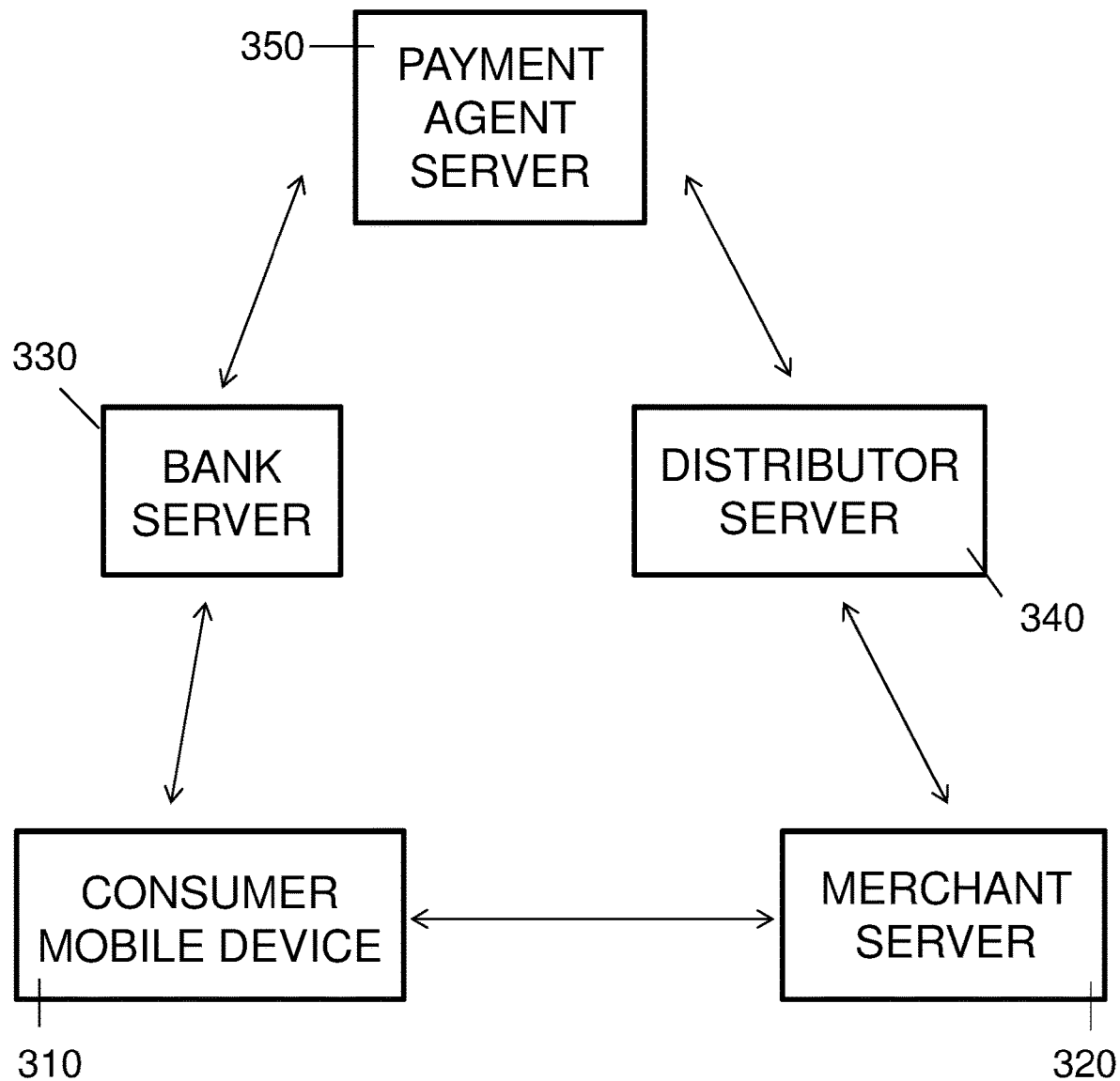
FIG. 3 is a schematic representation of devices participating in a tokenized transaction according to an embodiment of the present disclosure.

FIG. 3 shows an arrangement of devices participating in a tokenized transaction with which the present disclosure may be used. FIG. 3 broadly corresponds to FIG. 1, but shows the computing devices participating in a tokenized transaction. In this example, a consumer 10 is shopping on a mobile computing device 310 such as a tablet or smart phone. The consumer 10 is shopping on a merchant's website provided by the merchant's server 320. The consumer's bank 30 has a bank server 330, the distributor 40 has a distributor server 340, and the payment agent 50 has a payment agent server 350.

Figure 4:
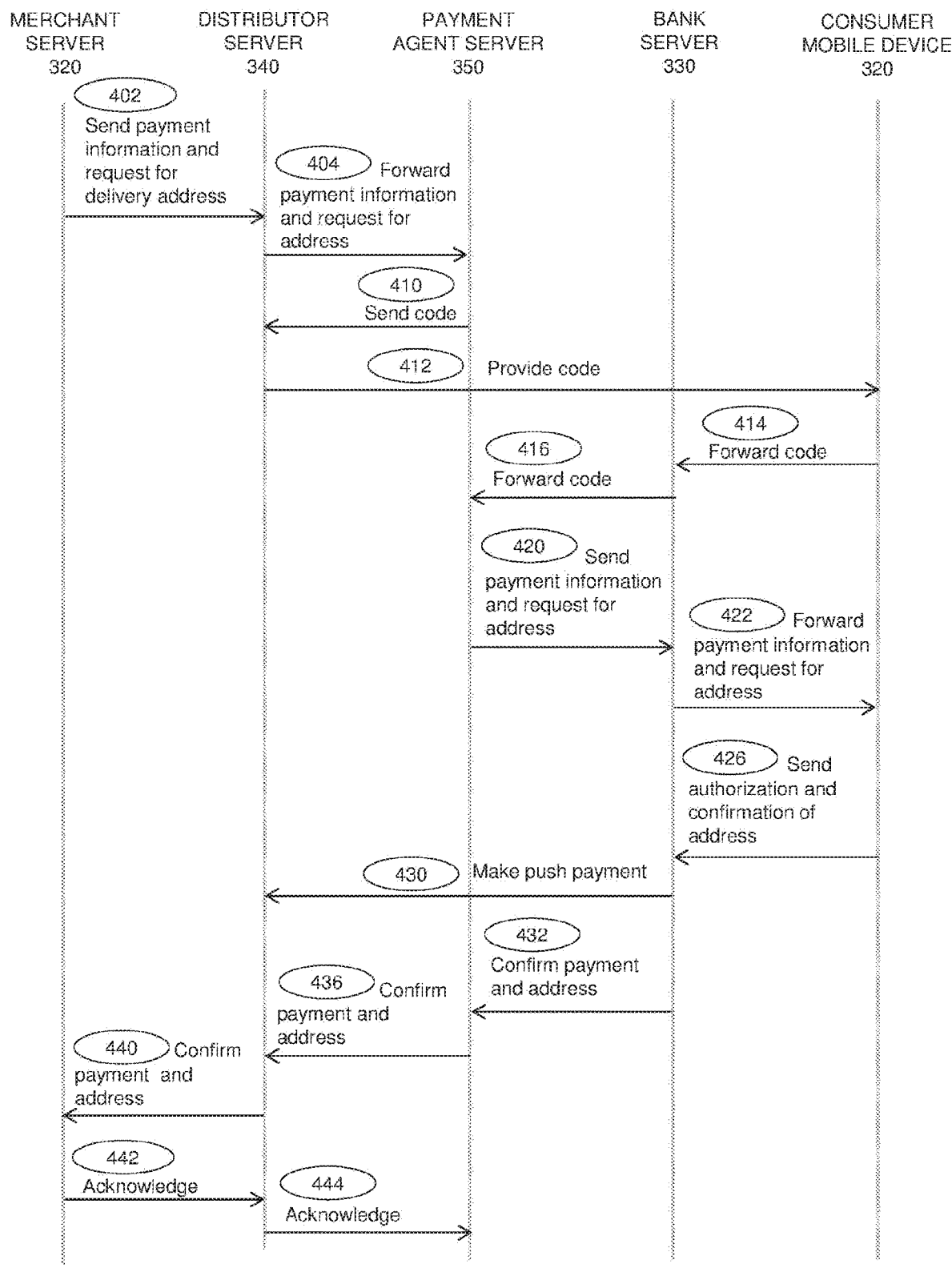
FIG. 4 is a schematic representation of the messages sent during a tokenized transaction according to an embodiment of the present disclosure.
Figure 5A:
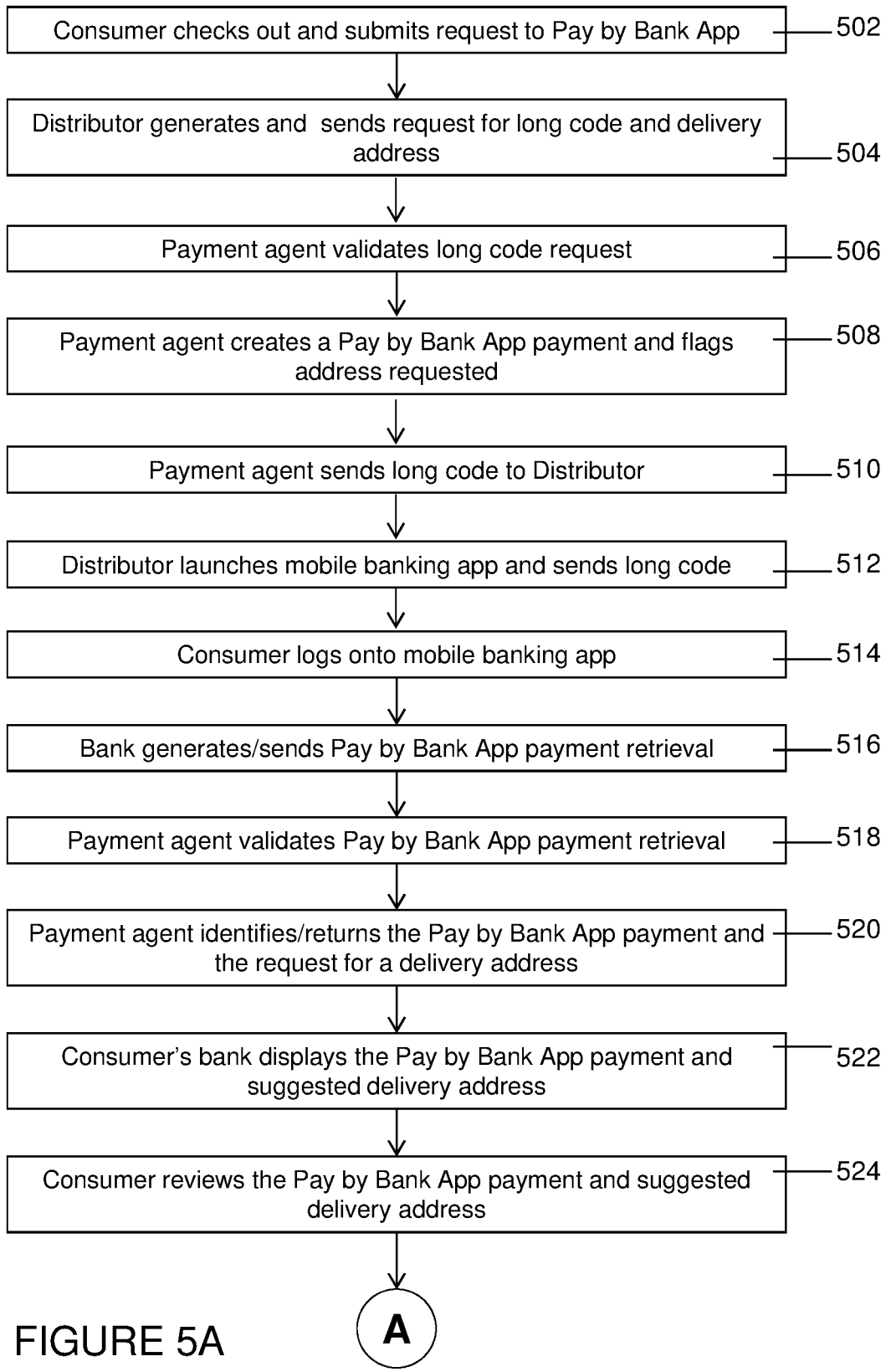
FIGS. 5A and 5B combine to provide a schematic representation of the steps in the tokenized transaction of FIG. 4.
Figure 5B:
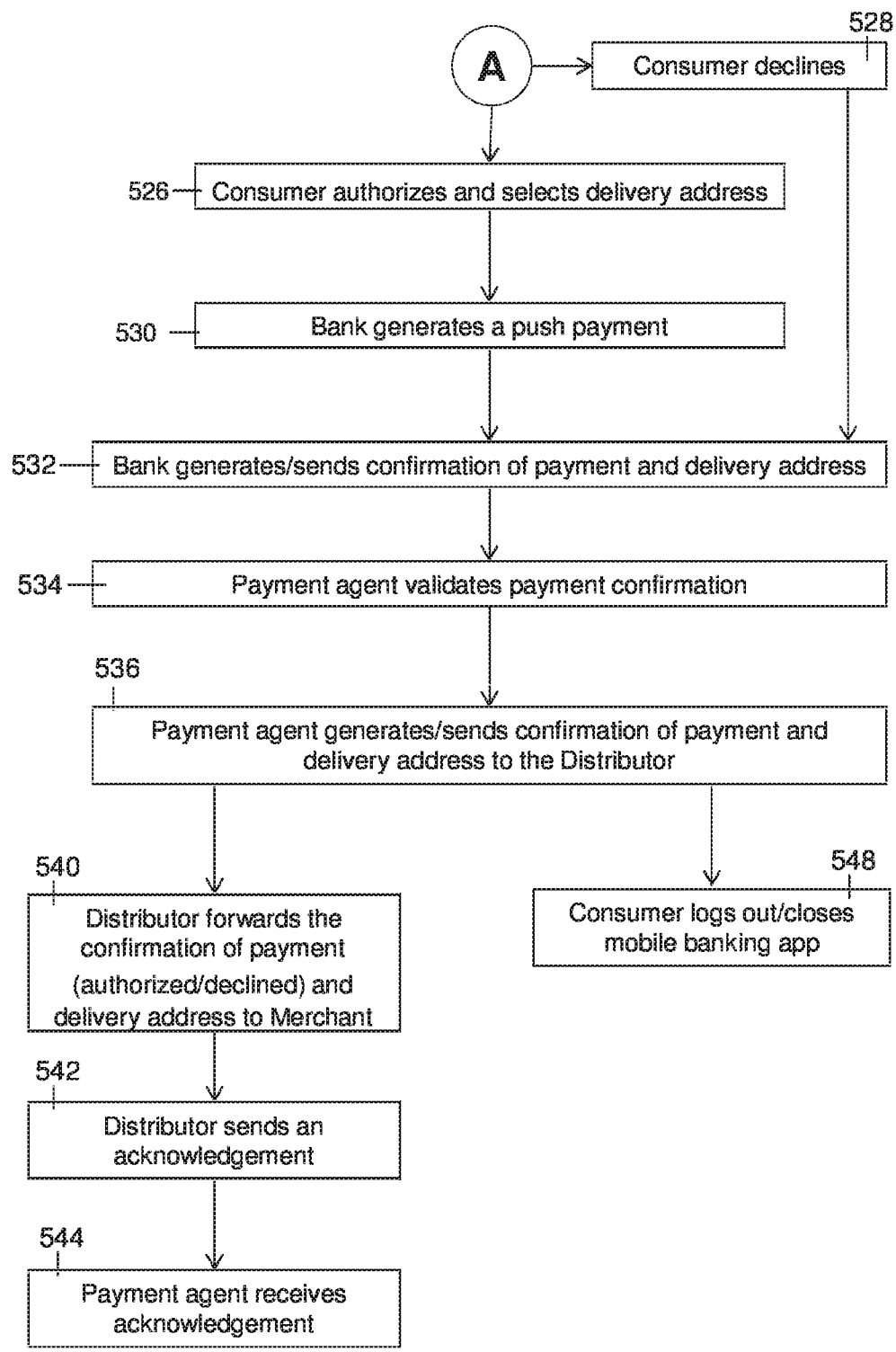

FIGS. 5A and 5B show the steps performed in the tokenized transaction scheme of the first embodiment of the present disclosure, and FIG. 4 shows the messages sent as the method is performed.

At 502, the consumer 10 has completed their shopping on the merchant's website and so proceeds to a checkout webpage. This checkout webpage is provided by the distributor server 340. To allow payment to be taken, the merchant server 320 provides the transaction details 402 to the distributor server 340. The transaction details include a merchant identifier and the transaction total and, may be a description of the items being purchased. At this stage, the consumer 10 has not provided a delivery address for the goods or services being bought. Therefore, the merchant server 320 also adds a request for a delivery address to the transaction details 402 provided to the distributor server 340.

As implemented, the disclosure provides the checkout webpage with a "Pay By Bank App®" button which allows the consumer 10 to indicate that they wish to pay using the Pay By Bank App® tokenized transaction scheme. Of course, the present disclosure may be used with other tokenized transaction schemes. The consumer 10 selects this button, which causes the method to proceed to step 504.

At step 504, the distributor server 340 forwards all or some of the transaction details to the payment agent server 350 as part of a request for both a long payment code and a delivery address, shown at 404. The request for the long payment code may be initiated by the merchant 20 which will be forwarded by the distributor server 340. Hence, this is a merchant initiated tokenized transaction scheme in that it is the merchant 20 (via the distributor 40) who initiates the tokenized transaction by requesting a payment code from the payment agent 50. Although the distributor server 340 sends transaction details, this is accompanied by a request for a long payment code and is not a request for payment as would be made when requesting a pull payment.

Upon receiving the request for a payment code and a delivery address 404, the payment agent server 350 validates the request as shown at 506 by checking that the merchant 20 is registered with the payment agent 50. If the merchant 20 is successfully validated, the payment agent server 350 generates a Pay By Bank App® payment at step 508. That is, the payment agent server 350 generates a long payment code and stores it in memory along with the transaction details that were sent with message 404. The payment agent server 350 also stores a flag to indicate that a delivery address has been requested. Next, at step 510, the payment agent server 350 sends the long payment code as message 410 to the distributor server 340.

The distributor server 340 then, through the checkout webpage it provides, runs a script to launch a mobile banking app stored on the consumer's mobile device 310, as shown at 512. Alternatively, the merchant 20 may launch the banking app, through its website or, if the consumer 10 is using a merchant app, through the merchant app. The distributor server 340 (or merchant 20, as noted above) also sends the long payment code to the banking app as shown at 512 and 412. At step 514, the consumer 10 logs onto the banking app, for example by providing a PIN when prompted to do so. The consumer 10 logging on causes the banking app to send the bank server 330 the long payment code, as shown at 414, to alert the bank 30 to the fact that the consumer 10 wants to make a payment using the tokenized transaction scheme.

Then, at step 516, the bank server 330 generates and sends a message 416 to the payment agent server 340 that includes the long payment code and requests the transaction details. At step 518, the payment agent server 340 validates the request, i.e. ensures that the request is from a registered bank. If successful, at step 520, the payment agent server 340 identifies the Pay By Bank App® payment from memory using the long payment code it has just received as an identifier, retrieves the transaction details and sends them to the bank server 330 as shown by message 420. The payment agent server 340 also responds to the flag stored in memory at step 508 by adding a request for a delivery address to the message 420. The bank server 330 will then provide the transaction details and the request for a delivery address 422 to the banking app running on the consumer mobile device 310, as shown at step 522.

The transaction details are displayed to the consumer 10 at step 524. For example, the merchant 20 may be identified and the transaction amount may be provided.

In addition, a delivery address is also displayed by the consumer mobile device 310. The consumer 10 will have one or more delivery addresses stored in memory, for example as a cookie, either on the consumer mobile device 320 or with the bank server 330. If the delivery address is stored at the bank server 330, the delivery address may be pushed to the consumer mobile device 320 with the message 422. Alternatively, the delivery address may be pulled from the bank server 330 by the consumer mobile device 320 upon receipt of message 422. The consumer 10 may select the displayed delivery address, for example by selecting a user control, for example a control button labelled "confirm" positioned next to the displayed delivery address.

The consumer 10 may store more than one delivery address. In this case, all the stored delivery addresses may be displayed by the consumer mobile device 320 such that the consumer 10 may select one. Alternatively, a default stored delivery address may be displayed along with a user control labelled "alternative addresses" or similar so that, when selected, the consumer mobile device 320 then displays all the stored delivery addresses such that the consumer 10 may select one.

An option may be provided for the consumer 10 to use an address other than one of the stored delivery addresses. For example, a user control labelled "enter an address" or similar may be displayed. When selected, this user control may cause the consumer mobile device 320 to display text entry fields to allow the consumer 10 to enter a delivery address. Once entered, the consumer mobile device 320 may offer the consumer 10 the opportunity to store the new delivery address.

As well as selecting a delivery address, the consumer 10 may authorize the transaction such that an authorization message 426 is sent to the bank server 330 at step 526. The authorization message 426 will also include the transaction details and the long payment code, along with a confirmation of the delivery address. The confirmation of the delivery address may include the entire address or an identifier that allows the bank server to identify the address, for example an identifying code. If the consumer 10 declines the transaction, the consumer mobile device 310 sends a decline message to the bank server 330.

Assuming the transaction has been authorized by the consumer 10, the bank server 330 takes this as authority to arrange a push payment to the merchant 20 identified in the transaction details. The bank server 330 then performs its own authorization by checking that sufficient funds are available to cover the transaction amount specified in the transaction details. If the bank server 330 can authorize the transaction, the bank server 330 generates a push payment 430 at step 530 using the transaction details including the amount and the merchant identifier contained in the transaction details. The push payment effectively pushes money from the consumer's bank account into the merchant's account held by the distributor 40. The merchant account may be determined from the merchant identifier contained in the transaction details, either directly or indirectly for example via a look-up table.

At 532, the bank server 330 generates and sends a payment confirmation 432 to the payment agent server 340 (or a decline notice if the consumer 10 declined the transaction at step 528), along with the delivery address. This may be taken directly from the message 426 received from the consumer mobile device 320 or, if the message 426 contained an identifier, the bank server 330 may use the identifier to retrieve the associated delivery address before supplying that address as part of message 432. This payment confirmation 432 also includes the long payment code and the transaction details.

The payment agent server 350 validates the payment confirmation at step 534 by validating the bank 20 sending the confirmation 432 and ensuring it carries a valid long payment code. The payment agent server 350 may generate and send an acknowledgement to the bank server 330. The payment agent server 350 then generates and sends to the distributor server 340 a confirmation of the payment and provides the delivery address to the distributor server 340 as message 436 as shown at step 536. The payment confirmation 436 both include the long payment code and the transaction details.

The distributor server 340, in turn, sends a confirmation of the payment and provides the delivery address to the merchant server 320 as message 440 for display to the merchant 20 so that the merchant 20 can fulfill the purchase if authorized or void the transaction if declined, as shown at 540. The merchant 20 may be identified by the merchant identifier contained in the transaction details. The merchant server 320 acknowledges the confirmation 440 by sending message 442 to the distributor server 340 at step 542. The distributor server 340 returns an acknowledgement 444 to the payment agent server 350 at step 544.

The distributor server 340 may send a confirmation of the payment and provides the delivery address to the consumer mobile device 310 for display to the consumer 10 on the banking app. This message 426 may be sent via the bank server 330. The banking app may display the merchant 20, the transaction amount, the delivery address, and a message either to confirm that the transaction has been made or that the transaction has been voided. This step 536 may also see the webpage provided on the consumer mobile device 310 by the distributor server 340 refresh to display a payment successful confirmation (or notice that the transaction was declined), and may also redirect back to a webpage provided by merchant server 320 that may also confirm the transaction was authorized or declined, and may confirm that the items purchased have been released for delivery (or the services purchased will be provided). The consumer may then log out of the mobile banking app as shown at step 548.

If a delivery address is provided by the consumer 10 initially, for example at or before step 502, then the method may continue as above but without any of the details regarding collection of the delivery address. For example, the request for a delivery address described above may be replaced by the delivery address already provided by the consumer 10, and the address need not be displayed to the consumer 10 for the consumer to select again. Alternatively, no address details need be exchanged.

Figure 6:
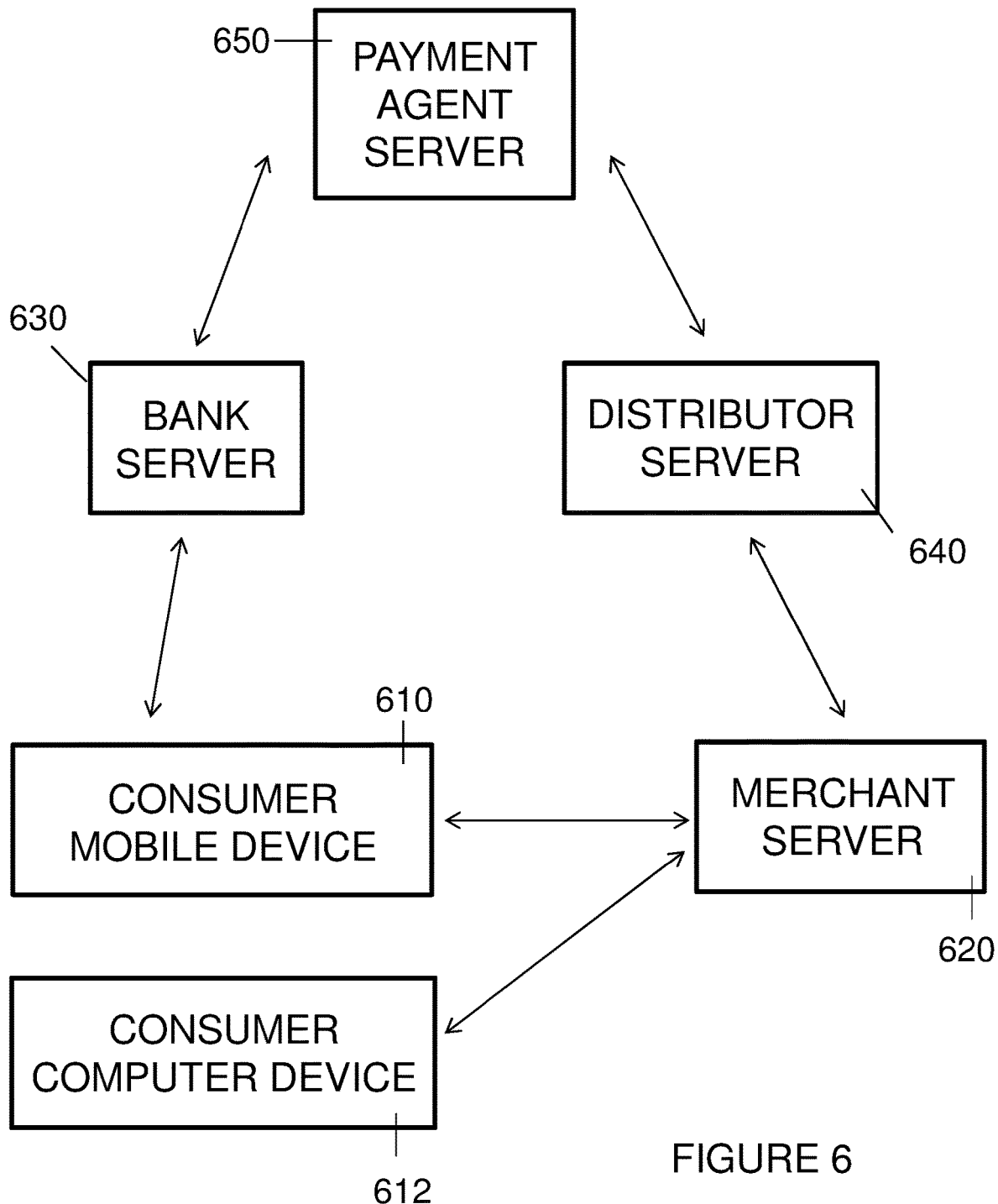
FIG. 6 is a schematic representation of devices participating in a tokenized transaction according to another embodiment of the present disclosure.

FIG. 6 shows an arrangement of devices participating in a tokenized transaction according to a second embodiment of the present disclosure. FIG. 6 broadly corresponds to FIG. 3 but, in this example, the consumer 10 is shopping on a merchant's website provided by the merchant's server 620 using a first computing device 612 such as a desktop computer or a laptop computer. The consumer computer device 612 may or may not be a mobile computer device. However, the consumer 10 also has a second computer device which, in this example embodiment, is a mobile device 610 such as a tablet or smart phone, and which is used to authorize tokenized transactions.

Figure 7:
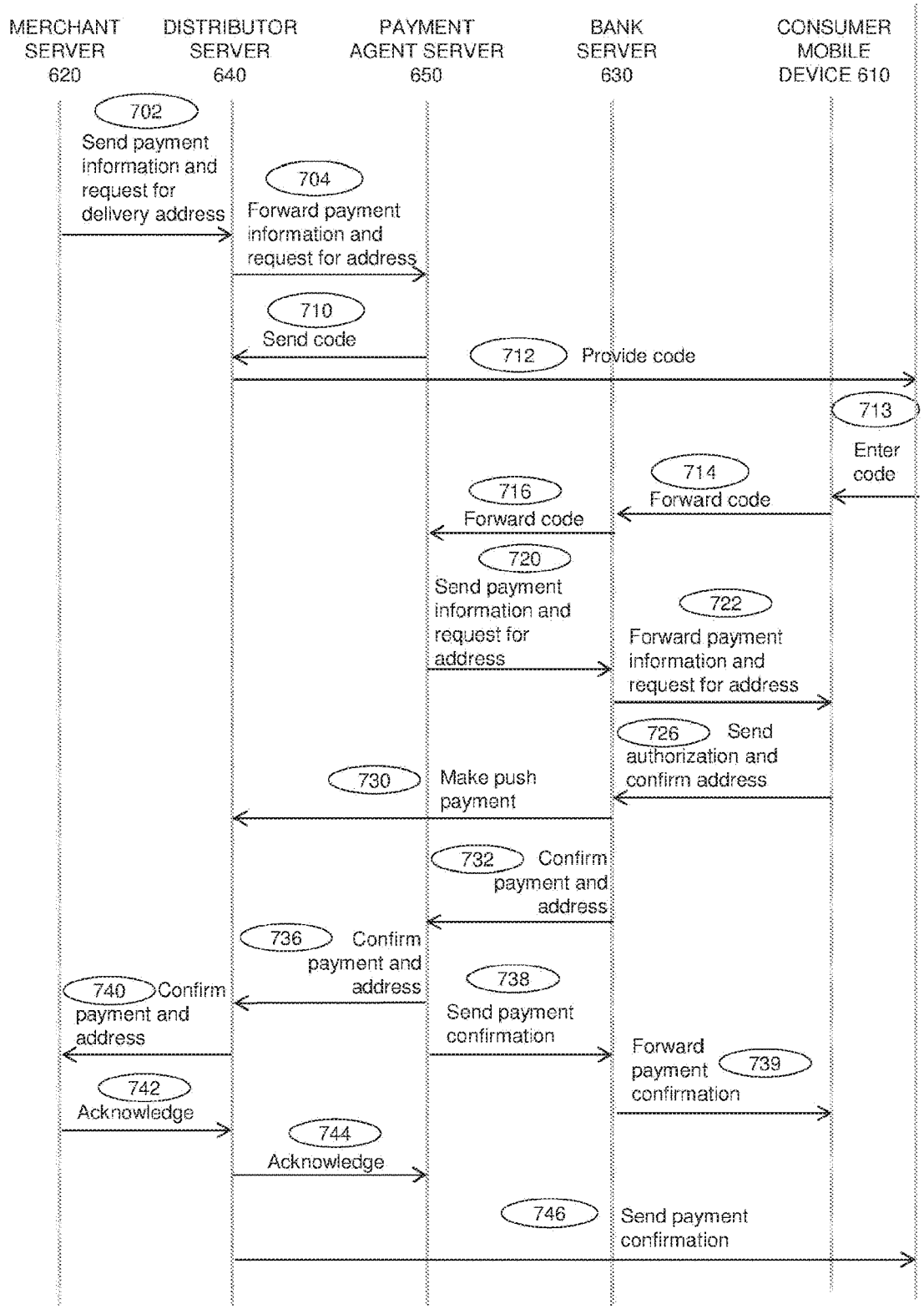
FIG. 7 is a schematic representation of the messages sent during a tokenized transaction according to an embodiment of the present disclosure.
Figure 8A:
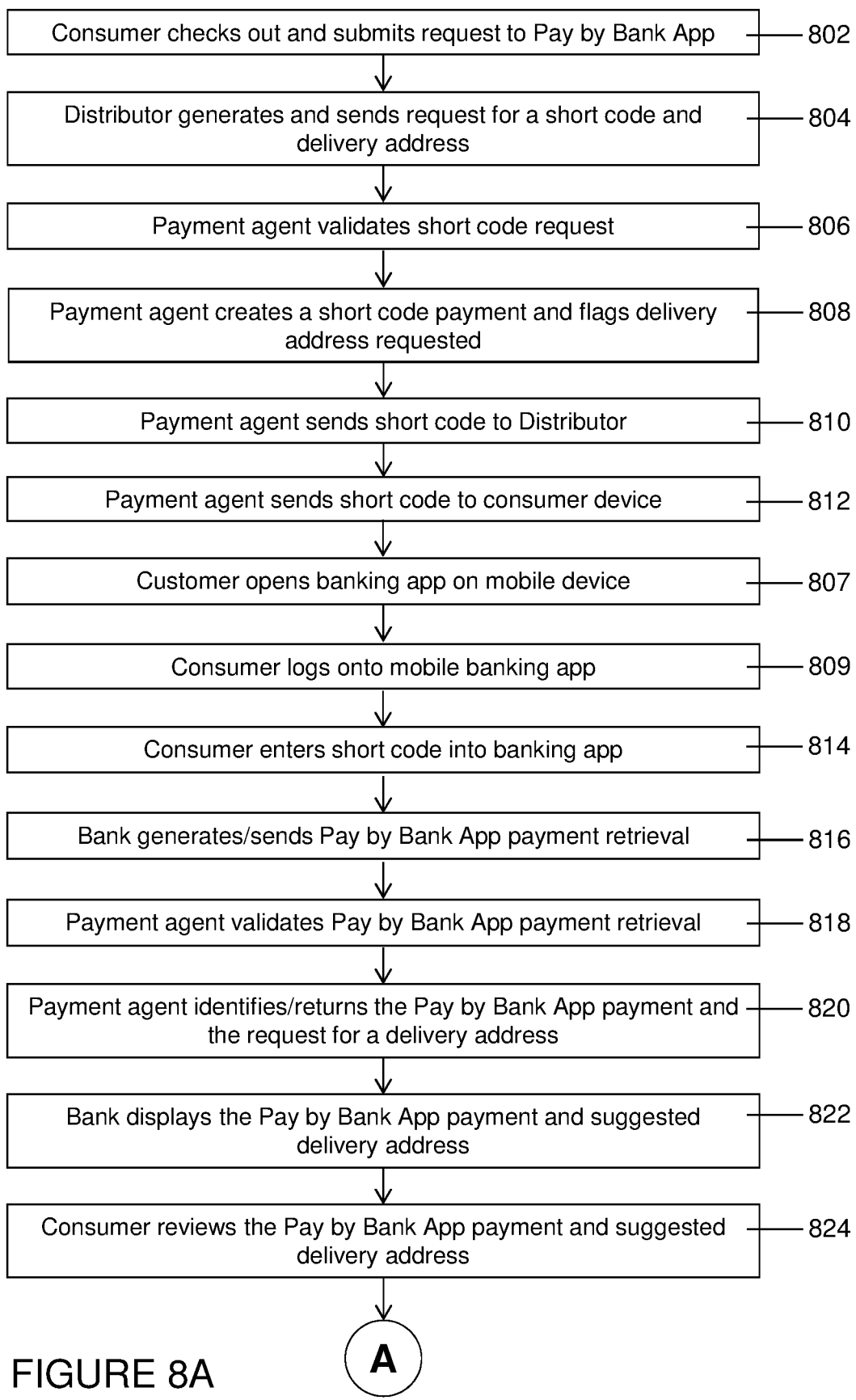
FIGS. 8A and 8B combine to provide a schematic representation of the steps in the tokenized transaction of FIG. 7.
Figure 8B:
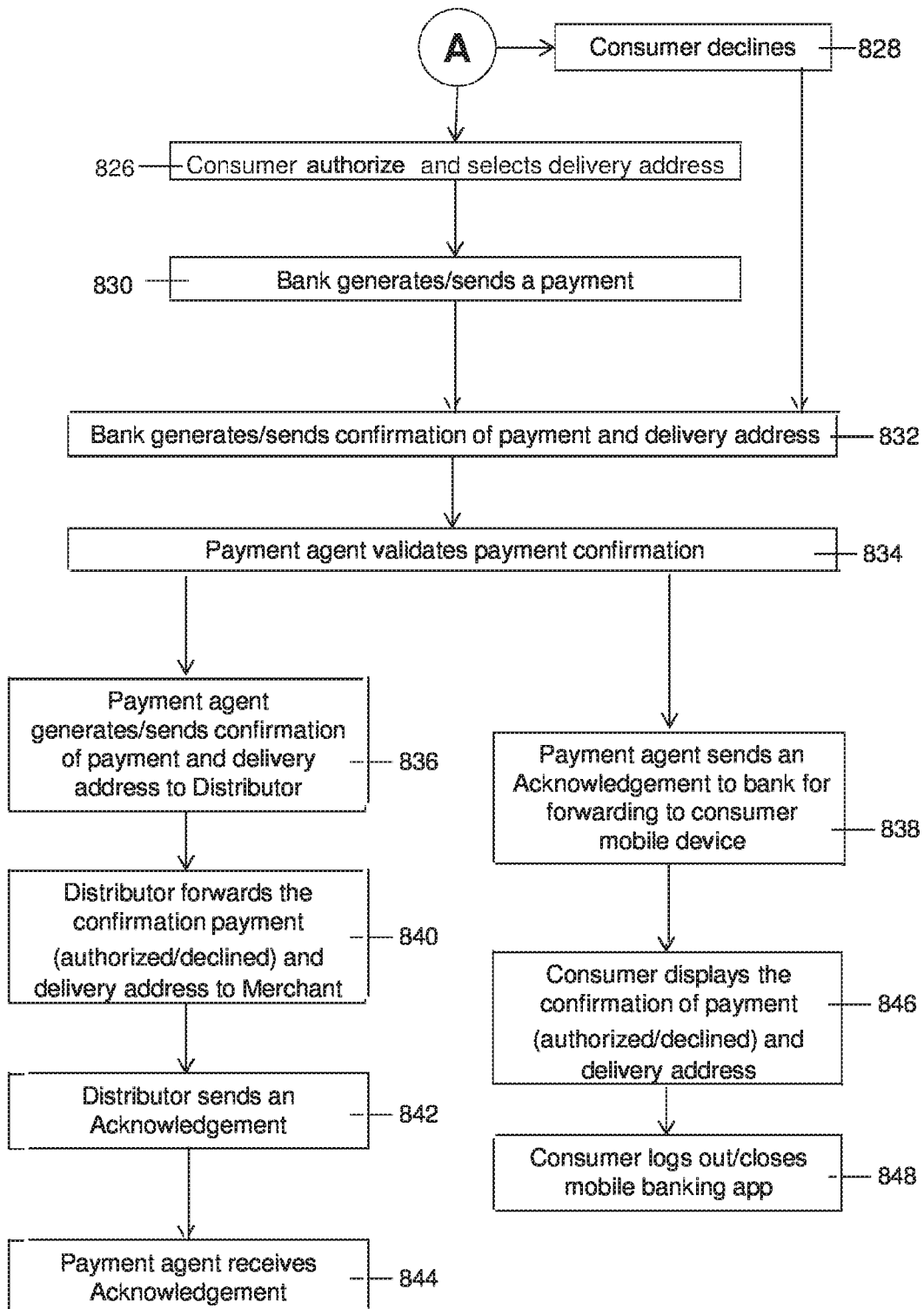

FIGS. 8A and 8B show the steps performed in the tokenized transaction scheme of the second embodiment of the present disclosure, and FIG. 7 shows the messages sent during the method. FIGS. 7, 8A, and 8B broadly correspond to FIGS. 4, 5A, and 5B. Steps 802 to 810 and messages 702 to 712 correspond to steps 502 to 510 and messages 502 to 512 respectively and so will not be described in detail again.

Steps 828 to 830 correspond to steps 528 to 530 respectively and so will not be described in detail again. In this embodiment, the consumer 10 is using a web browser provided by the consumer computer device 612 to shop and so uses this device 612 to proceed to the checkout webpage provided by the distributor server 640. As before, the consumer 10 has not provided a delivery address.

At step 712, the distributor server 340 updates the checkout webpage displayed by the web browser to display a short payment code that has been requested by the distributor server 640 and provided by the payment agent server 650.

At step 807, the consumer 10 launches a banking app resident on the consumer mobile device 610, and then logs onto the banking app at step 809. The banking app may then be used by the consumer 10 to indicate that a Pay By Bank App® payment is required. This causes the banking app to prompt the consumer 10 to enter the short payment code, as shown at 713 and 814.

As noted above, a short payment code is used in this embodiment because the consumer 10 must enter this payment code manually, as compared to the long payment code used in the first embodiment. It will be appreciated that use of a short code is less secure, but does not place too onerous a requirement of the consumer 10 who must enter the code manually and also carries a reduced risk of the consumer 10 typing the payment code incorrectly. The short payment code and/or the long payment code may be alphanumeric, alphabetic, or numeric. Entering the short payment code causes the consumer mobile device 610 to send the short payment code to the bank server 630 as shown at 714 and 812.

The remainder of the method continues in much the same way as has been previously described for the first embodiment and so only a short summary is provided here. At step 816, the bank server 630 generates and sends a message 716 to obtain the transaction details. At step 818, the payment agent server 650 validates the request, i.e., ensures that the request is from a registered bank.

At step 820, the payment agent server 650 retrieves the transaction details using the short payment code it has just received, and sends them to the bank server 630. The payment agent server 340 also responds to the flag stored in memory at step 808 by adding a request for a delivery address to the message 720. The bank server 630 will then provide the transaction details and the request for a delivery address 722 to the banking app running on the consumer mobile device 610, as shown at step 822.

The transaction details are displayed to the consumer 10 on the consumer mobile device at step 824 for the consumer 10 to authorize or decline. In addition, a delivery address is also displayed as has already been described with respect to step 524 of FIG. 5A. All of the options described with respect to step 524 may be used with step 824.

Where the transaction has been authorized, the bank server 630 takes this as authority to arrange a push payment 730 to the merchant 20 identified in the transaction details. At 832, the bank server generates and sends a payment confirmation 732 to the payment agent server 640 (or a decline notice if the consumer 10 declined the transaction), along with the delivery address. This may be taken directly from the message 726 received from the consumer mobile device 320 or, if the message 726 contained an identifier, the bank server 330 may use the identifier to retrieve the associated delivery address before supplying that address as part of message 732.

The payment agent server 640 validates the payment confirmation at step 834 and then generates and sends a confirmation of the payment and provides the delivery address to the distributor server 640 as message 736 at step 836. In contrast to the first embodiment, the payment agent server 640 generates and sends an acknowledgement 742 to the bank server 630 at step 838. The acknowledgement 742 includes the short payment code and the transaction details. This step 838 is optional and may be omitted.

The distributor server 640, in turn, sends the payment confirmation and delivery address as message 740 to the merchant server 620 for display to the merchant 20 so that they can fulfill the purchase in step 840. The distributor server 340 also returns an acknowledgement 744 (in step 842) to the payment agent server 650 at step 844. In addition, at step 846, the distributor server 640 sends the acknowledgement 746 to the consumer computer device 612 for display to the consumer 10 via the web browser. This step 846 sees the webpage provided by distributor server 640 refresh to display a payment successful confirmation (or notice that the transaction was declined), and may also redirect back to a webpage provided by merchant server 620 that may also confirm the transaction was authorized or declined, and may confirm that the items purchased have been released for delivery and may show the delivery address.

When the payment agent server 650 send the acknowledgement 738 to the bank server 630, the bank server 630 then forwards the acknowledgement as payment acknowledgement 739 which is received by the banking app running on the consumer mobile device 610. At 846, the banking app displays the merchant, the transaction amount and, optionally, the delivery address, along with a message either to confirm that the transaction has been made or that the transaction has been voided. The consumer 10 may then log out of the mobile banking app as shown at step 848.

Those skilled in the art will appreciate that variations may be made to the above embodiments without departing from the scope of the disclosure that is defined by the appended claims.

For example, FIGS. 1, 3, and 6 show the transaction to involve five participants, namely the consumer 10, the merchant 20, the bank 30, the distributor 40, and the payment agent 50. However, the transaction may involve a greater or lesser number of participants.

Fewer participants may be involved where a participant assumes more than one role within the transaction. For example, the bank 30 may also act as the distributor 40, for example where the bank 30 is responsible for managing the accounts held by both the consumer 10 and the merchant 20. Alternatively, the bank 30 may act as the payment agent 50. In addition, the merchant 20 or the consumer 10 may be a bank 30. As an example, a consumer 10 may wish to use a tokenized transaction scheme to arrange a payment to pay a credit card bill relating to a credit card provided by their bank 30. In this example, the bank 30 will also act as the merchant 20 and most likely will also act as the distributor 40. It will be readily apparent how the transaction schemes above may be adapted when a participant adopts more than one role in the transaction. Where messages are sent between parties, but the roles are provided by a common participant, the message need not be sent nor an acknowledgment returned. Where another participant sits between the roles provided by a single participant, messages may be simply bounced back and forth between the two participants. This would be the case where the bank 30 also fulfills the role of the distributor 40 such that messages may be bounced back and forth with the payment agent 50.

A greater number of participants may be involved in the transaction. The merchant may include more than a single party. By way of example, the merchant may provide a "marketplace" website for different traders to present their goods and/or services: payment may then be effected directly to the trader and the distributor may be related to the trader rather than to the merchant. Also, the distributor 40 may have an associated financial institution such as a bank or building society that handles accounts for the distributor. Other intermediaries may be involved, and these intermediaries may simply forward messages sent during the transaction, or may forward messages after performing some operation on the messages, for example to perform a check or to add further information to the messages. In this context, forwarding may include sending new messages containing the same information as was contained in the messages as set forth in the foregoing description and in the following claims. The intermediaries may store copies of the messages or extract information from the messages, for example because of regulatory or auditing purposes. Also, other interested parties may receive information relating to the transaction. For example, these other interested parties may be copied messages sent during the transaction, or may be sent information relating to the transactions. These interested parties may return acknowledgements.

The invention claimed is:

1. A computer-implemented method of facilitating placement of an order and delivery between a consumer and a merchant without the consumer providing a delivery address directly to the merchant, the method comprising:

(i) a computing apparatus of the consumer, upon checkout for purchase of one or more items from a website of the merchant and upon being redirected to a web page hosted by a distributor associated with the merchant, submitting via the web page, an order for the one or more items to a computing apparatus of the merchant without providing the delivery address, wherein a computing apparatus of the distributor is configured to send a request to a computing apparatus of a payment agent for a payment identification code and a delivery address associated with the order, the request including payment information associated with the order, the payment information including an identification of the merchant and a payment to be made to the merchant, and receive, based on the request, the payment identification code generated by the computing apparatus of the payment agent;

(ii) receiving by the computing apparatus of the consumer, from the computing apparatus of the distributor, the payment identification code and, sending the payment identification code to a computing apparatus of a financial institution, wherein the computing apparatus of the financial institution is configured to send the payment identification code to the computing apparatus of the payment agent and receive from the computing apparatus of the payment agent, based on the sent payment identification code, the payment information and a request for the delivery address;

(iii) receiving by the computing apparatus of the consumer, from the computing apparatus of the financial institution, the payment identification code, and a request for the delivery address; and (iv) based on a prompt to the consumer by the computing apparatus of the consumer, receiving by the computing apparatus of the consumer an authorization for the payment and an identifying code of the delivery address, and based on the authorization, sending to the computing apparatus of the financial institution a request to make the payment, the request including the identification code and the identifying code, wherein based on the request, the computing apparatus of the financial institution is configured to arrange for making the payment from the consumer to the merchant, and retrieve, based on the identifying code, the delivery address from a memory of the computing apparatus of the financial institution for sending to the computing apparatus of the payment agent, and wherein a confirmation of the payment and the delivery address are received by the computing apparatus of the merchant via the computing apparatuses of the payment agent and the distributor, and based on receiving the confirmation of the payment and the delivery address by the computing apparatus of the merchant, the computing apparatus of the merchant is configured to arrange for release of the one or more items for delivery.

2. A compute system for facilitating placement of an order between a consumer and a merchant without the consumer providing a delivery address directly to the merchant, the computer system comprising:
at least one processor; and
a memory, operationally coupled to the at least one processor, and including instructions, that when executed by the at least one processor, cause the at least one processor to:
(i) upon checkout for purchase of one or more items from a website of the merchant and upon being redirected to a web page hosted by a distributor associated with the merchant, submit via the web page, an order for the one or more items to a computing apparatus of the merchant without providing the delivery address, wherein a computing apparatus of the distributor is configured to send a request to a computing apparatus of a payment agent for a payment identification code and a delivery address associated with the order, the request including payment information associated with the order, the payment information comprising an identification of the merchant and a payment to be made, and receive, based on the request, the payment identification code generated by the computing apparatus of the payment agent;
(ii) receive from the computing apparatus of the distributor, the payment identification code and, send the payment identification code to a computing apparatus of a financial institution, wherein the computing apparatus of a financial institution is configured to send the payment identification code to the computing apparatus of the payment agent and receive from the computing apparatus of the payment agent, based on the sent payment identification code, the payment information and a request for the delivery address;
(iii) receive from the computing apparatus of the financial institution, the payment identification code, and a request for the delivery address; and
(iv) receive an authorization for the payment and an identifying code of the delivery address from a consumer associated with the order and, based on the authorization, send to the computing apparatus of the financial institution a request to make the payment, the request including the identification code and the identifying code, wherein based on the request, the computing apparatus of the financial institution is configured to arrange for making the payment from the consumer to the merchant, and retrieve, based on the identifying code, the delivery address from a memory of the computing apparatus of the financial institution for sending to the computing apparatus of the payment agent, and wherein a confirmation of the payment and the delivery address are received by the computing apparatus of the merchant via the computing apparatuses of the payment agent and the distributor, and based on receiving the confirmation of the payment and the delivery address by the computing apparatus of the merchant, the computing apparatus of the merchant is configured to arrange for release of the one or more items for delivery.

3. The computer-implemented method according to claim 1, wherein the web page hosted by the distributor on the computing apparatus of the consumer displays a payment successful message and redirects the computing apparatus of the consumer back to website of the merchant, the website displaying the authorization of the payment and release of the one or more items for delivery.

4. The computer-implemented method according to claim 1, wherein retrieving the delivery address from a memory of the computing apparatus of the financial institution comprises checking an authenticity of the merchant before arranging for sending the delivery address to the computing apparatus of the merchant.

5. The computer-implemented method according to claim 1, wherein the payment from the consumer to the merchant is effected based on a pre-agreed procedure between the financial institution and the merchant.

6. The computer-implemented method according to claim 5, wherein the pre-agreed procedure is based on United Kingdom's Faster Payment.

7. The computer-implemented method according to claim 1, wherein the payment information comprises a description of the one or more items.

8. The computer-implemented method according to claim 1, wherein receiving the authorization for the payment comprises launching a banking application resident on the computing apparatus of the consumer and providing the authorization for the payment via the banking application.

9. The computer-implemented method according to claim 1, wherein the method further comprises the payment agent ensuring that the financial institution is a registered financial institution.

10. The computer system according to claim 2, wherein retrieving, based on the identifying code, the delivery address from a memory of the computing apparatus of the financial institution comprises checking an authenticity of the merchant before arranging for sending the delivery address to the computing apparatus of the merchant.

11. The computer system according to claim 2, wherein the payment from the consumer to the merchant is effected based on a pre-agreed procedure between the financial institution and the merchant.

12. The computer system according to claim 2, wherein the web page hosted by the distributor on the computing apparatus of the consumer displays a payment successful message and redirects the computing apparatus of the consumer back to website of the merchant, the website displaying the authorization of the payment and release of the one or more items for delivery.

13. A computer-implemented method of facilitating placement of an order between a consumer and a merchant, the method performed using a computing device of a consumer, and comprising:

upon checkout for purchase of one or more items from a website of the merchant and upon being redirected to a web page hosted by a distributor associated with the merchant, the computing device of the consumer submitting an order for the one or more items to a computer apparatus of the merchant without providing a delivery address;

receiving a payment identification code associated with the order, and generated by a computing apparatus of a payment agent from the computer apparatus of the merchant via computing apparatuses of the payment agent and the distributor;

sending the payment identification code to a computing apparatus of a financial institution, wherein the financial institution is associated with the consumer for making payments from the consumer;

receiving, by the computing device of the consumer, from the computing apparatus of the financial institution a request for the delivery address, the payment identification code, and payment information associated with the order, wherein the payment information identifies the merchant and an amount to be paid;

receiving, by the computing device of the consumer, from the consumer a payment authorization for the order, the payment information and an identifying code of the delivery address; and sending, by the computing device of the consumer, a request to pay, the payment information and the identifying code to a computing apparatus of the financial institution, wherein the computing apparatus of the financial institution is configured to retrieve from a memory of the computing apparatus of the financial institution the delivery address of the consumer based on the identifying code, provide the delivery address and arrange payment of the amount to the merchant via the distributor thereby enabling the merchant to release the order for delivery.

14. A computer-implemented method of facilitating placement of an order for one or more items between a consumer and a merchant, the method performed using a computing apparatus of a distributor, wherein the distributor is associated with the merchant for collecting payments due to the merchant, the method comprising:

sending a request for a payment identification code and a delivery address associated with the order to a computing apparatus of a payment agent, wherein the request comprises payment information for the order, the payment information identifying the merchant and an amount to be paid;

receiving the payment identification code generated by the computing apparatus of the payment agent;

providing to a computing apparatus of the consumer the payment identification code, wherein, upon checkout for purchase of one or more items from a website of the merchant and upon being redirected to a web page hosted by the distributor, the computing apparatus of the consumer is configured to submit via the web page, the order to a computing apparatus of the merchant without providing the delivery address;

arranging to make a payment of the amount to the merchant from the consumer based on an arrangement with a financial institution associated with the consumer for making payments from the consumer;

receiving, from the payment agent, payment confirmation and the delivery address provided by a computing apparatus of the financial institution, wherein the computing apparatus of the financial institution is configured to retrieve the delivery address from a memory of the computing apparatus of the financial institution based on receiving an identifying code for the delivery address from the computing apparatus of the consumer; and providing the payment confirmation and the delivery address to the merchant thereby enabling the merchant to release the order.

15. A computer-implemented method of facilitating placement of an order between a consumer and a merchant, the method performed using a computing device of a merchant, the method comprising:

upon checkout for purchase of one or more items from a website of the merchant and upon being redirected to a web page hosted by a distributor associated with the merchant, receiving, via the web page, from a computing device of a consumer, an order for the one or more items, wherein the order does not include a delivery address;

sending to a computing apparatus of the distributor, a request for the delivery address and a payment identification code associated with the order, wherein the request identifies the merchant and an amount to be paid;

providing the consumer with the payment identification code generated by a computing apparatus of a payment agent and received via the computing apparatuses of the payment agent and the distributor;

receiving payment of the amount arranged by a financial institution, via the distributor, wherein the financial institution is associated with the consumer for making payments from the consumer; and receiving the delivery address provided by a computing apparatus of the financial institution wherein the computing apparatus of the financial institution is configured to retrieve the delivery address from a memory of the computing apparatus of the financial institution based on receiving an identifying code for the delivery address from the computing device of the consumer, and wherein the merchant releases the order for delivery based on receiving the payment and the delivery address.

16. A computer-implemented method of facilitating placement of an order between a consumer and a merchant, the method performed using a computing apparatus of a payment agent, the method comprising:

receiving, responsive to a computing apparatus of the consumer, upon checkout for purchase of one or more items from a website of the merchant and upon being redirected to a web page hosted by a distributor associated with the merchant, submitting via the web page, an order for the one or more items, from a computing apparatus of the distributor a request for a payment identification code and a delivery address associated with the order, wherein the request comprises payment information associated with the order, the payment information identifying the merchant and an amount to be paid;

generating a payment identification code to be associated with the payment information providing the payment identification code to the computing apparatus of the distributor;

receiving the payment identification code from a financial institution, wherein the financial institution is associated with the consumer for making payments from the consumer;

using the payment identification code to retrieve the payment information; and sending the payment information and a request for a delivery address to a computing apparatus of the financial institution, wherein the computing apparatus of the financial institution is configured to retrieve the delivery address from a memory of the computing apparatus of the financial institution based on receiving an identifying coded of the delivery address from a computing apparatus of the consumer, and arrange for providing the retrieved delivery address and make a payment of the amount to the merchant via the distributor, thereby enabling the merchant to release the order for delivery.

17. A computer-implemented method of facilitating placement of an order between a consumer and a merchant, the method performed using a computing apparatus of a financial institution, wherein the financial institution is associated with the consumer for making payments from the consumer, the method comprising:

receiving, from a computing apparatus of a consumer, upon checkout for purchase of one or more items from a website of the merchant and upon being redirected to a web page hosted by a distributor associated with the merchant, and upon submitting via the web page, an order for the one or more items, a payment identification code associated with the order and generated by a computing device of a payment agent;

sending the payment identification code to the computing device of the payment agent;

receiving a request for a delivery address and payment information associated with the payment identification code, wherein the payment information comprises an identification of the merchant and an amount to be paid;

sending the payment information, the payment identification code, and the request for the delivery address to the computing apparatus of the consumer;

receiving a request to make a payment of the amount, the request including the payment identification code and an identifier of a delivery address from the computing apparatus of the consumer; and arranging for providing, to the computing apparatus of the merchant, the delivery address retrieved from a memory of the computing apparatus of the financial institution based on receiving the identifier, and arranging for making the payment from the consumer to the merchant via a distributor associated with the merchant for collecting payments due to the merchant, thereby enabling the merchant to release the order for delivery.

\* \* \* \* \*